United States Patent Office 3,396,239
Patented Aug. 6, 1968

3,396,239

SIGNAL CONVERTING SYSTEM FOR START-STOP TELEGRAPH SIGNALS

Kakuro Yamauchi, Setagaya-ku, Tokyo-to, Japan, assignor to Kokusai Denshin Denwa Kabushiki Kaisha, Tokyo-to, Japan, a Japanese joint-stock company Filed May 19, 1964, Ser. No. 368,588
Claims priority, application Japan, May 21, 1963, 38/25,447; Sept. 11, 1963, 38/47,964
6 Claims. (Cl. 178—26)

ABSTRACT OF THE DISCLOSURE

A system is provided for conversion of telegraph signals having redundant elements to those of isochronous binary type, wherein at least two-bit storage for data including redundancy bits is provided and controlled so as to read out such bits in the successive order stored at some isochronous period, the memory means sending out the last stored binary bit when a new bit for transmission is not received in storage. Means are described for multiplexing the data from a plurality of sources of such start-stop telegraph signals.

The present invention relates to a system for converting telegraph modulation speed or signal configuration of various start-stop telegraph signals and to a time-division multiplex system utilizing said converting system.

In a conventional telegraphic communication system, the use of isochronous telegraph signals for the sake of obtaining a multiplex system utilizing time-division modulation or synchronous modulation has been frequently practised. In this system, a teleprinter provided as a terminal device can be more easily and accurately operated by use of start-stop telegraph signals. Consequently, a signal converting system adapted to converting a start-stop telegraph signal to an isochronous telegraph and vice versa has been required. For this purpose, there has been adopted a system for storing an input signal in the state of a character base by means of an electrical or mechanical device, to convert the thus stored information into the output signal having telegraph modulation speed or signal configuration to be adapted to the output signal, and then to transmit the said converted signal to the succeeding stage. Furthermore, a system for controlling the start of the terminal teleprinter per character from the side of isochronous telegraph terminal has been practised. These conventional systems, however, have disadvantages in that the signal converting device is complicated and expensive. These disadvantages became a particularly important problem in the time-division multiplex system including a plurality of input communication circuits. In addition to the above disadvantages, there are other disadvantages, that is, signal conversion on character base makes conversion of the signal containing particular control pulse (for instance, exchange control signal or dial impulse necessary for telex exchange) impossible, and the transmittable signal configuration is restricted to a particular one.

An object of the present invention is to provide a signal converting system which has none of the disadvantages of the conventional signal converting systems and does not require storing of information on a character base.

Another object of the present invention is to provide a signal converting system capable of converting start-stop telegraph signals into isochronous signals having different telegraph modulation speed.

Still another object of the invention is to provide a signal converting system capable of converting a start-stop telegraph signal containing a control pulse having any code length other than the code signal into an isochronous signal having different telegraph modulation speed.

An essential object of the present invention is to provide a signal converting system capable of attaining time-division multiplex aggregation of start-stop telegraph signals in a very economical manner.

A further essential object of the present invention is to provide a signal converting system in which, in the case of successive tandem connection of a time-division multiplex system, errors such as character omission and duplicated character are not produced even though there are some differences between synchronous frequencies of the various sections.

A still further object of the present invention is to provide a signal converting system capable of attaining time-divisional aggregation of the start-stop telegraph signals, the number of unit elements of which are somewhat different, without errors caused by omission of any character.

The signal converting system according to the present invention comprises memory means for storing successively in series at least two bits of an input telegraph signal including redundant elements and control means for applying a reading-out signal to the memory means to read out successively in the stored successive order the stored binary information at a predetermined isochronous period, said memory means sending out the last stored binary information when a new bit of the input binary information to be read out is not being stored in the memory means, whereby an output isochronous binary signal converted is derived from the memory means. In accordance with the present invention the system can be provided with gate means for gating the instant state of the input telegraph signal when a new bit of the input binary information to be read out is not stored in the memory means. Moreover, when a plurality of said systems are prepared, a plurality of input telegraph signals each including readundant code elements are converted to a time-division multiple isochronous binary signal.

The novel features of this invention are set forth with particularity in the appended claims. This invention, however, both as to its construction and operation together with further objects and advantages thereof, may best be understood by reference to the following description, taken in connection with the accompanying drawings, in which the like parts are designated by the like reference characters, and in which:

Figure 1:
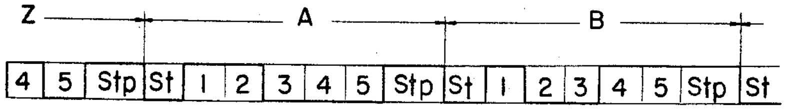
FIG. 1 is a waveform time chart illustrating a binary signal to be converted according to the system of this invention.

The following description relates mainly to the cases in which five unit telegraph signal including start-stop code elements such as are shown in FIG. 1 is used as the input binary information. The system of this invention, however, is not restricted to the case in which the duration of the stop element (*Stp*) is longer than that of other character elements.

Figure 2:
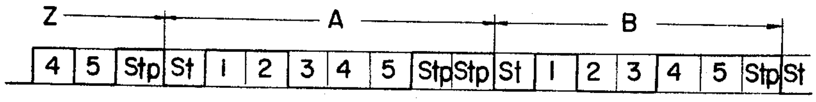
FIG. 2 is a waveform time chart indicating the signal obtained by converting the binary signal illustrated in FIG. 1 according to the system of this invention.
Figure 3:
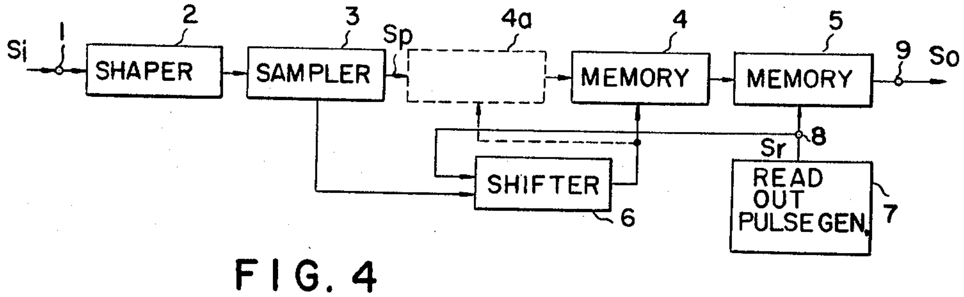
FIGS. 3, 4 and 5 are block diagrams showing examples of the code converting system according to this invention.

FIG. 3 is a block diagram illustrating a basic example of this invention, in which an input signal S*i* such as that shown in FIG. 1 applied to an input terminal 1 is first reshaped in a shaper 2 to the waveform distortion thereof, and then the binary information of the signal S*i* is detected per code element in a sampler (signal sampling circuit) 3, whereby a sampled signal S*p* is produced. The sampler 3 is a start-stop type counting circuit comprising as its main device a sampling pulse generating counter and a counter for counting the number of code elements. The sampled signal S*p* is introduced into a memory circuit 4. In the case in which input information directly acceptable into the memory circuit can be obtained, the shaper 2 and the sampler 3 may be omitted. Each of the memory circuits 4 and 5 is constructed so as to be capable of storing one bit of the information. The shifting of a binary information from the memory circuit 4 to the memory circuit 5 is carried out by a control signal sent from a shifter (shifting control circuit) 6. A reading-out pulse generator 7 applies a reading-out drive signal S*r* having an isochronous period corresponding to a predetermined telegraph modulation speed to an output terminal 8 thereof, whereby the information stored in the memory circuit 5 is read out, thus enabling reading-out of an output signal S*o* from the output terminal 9, said signal S*o* having been converted to an isochronous binary signal having a predetermined communication speed. In FIG. 2 is shown an illustration of the output signal S*o* corresponding to the input binary information shown in FIG. 1.

In the signal conversion according to the system as described above, since the instant when the input information is sampled and the instant when said sampled information is first stored in the memory circuits 4 and 5 and then read out at the output side are at random, the shifting control circuit 6 acts immediately to shift the binary information of the succeeding code element stored in the memory circuit 4 into the memory circuit 5 just after confirmation of reading-out of the binary information stored in the memory circuit 5 has been established.

Of course, for attaining accurate signal conversion by the above-mentioned operation, a certain relationship should be established between the communication speeds of the input and output signals. That is, in the above-mentioned signal converting system, it is necessary to make the capability of transmitting information in the output-side communication circuit equal to or somewhat larger than that of the input side communication circuit. Furthermore, compensation for the difference (matching) between the telegraph modulation speeds of the input and output sides is carried out by inserting a redundant code element at the position of stop element S*tp*. In this case, it is necessary, irrespective of such insertion, to produce no error in the transmission of the character. For this purpose, non-destructive sensing is carried out in the memory circuits 4 and 5 or at least in the memory circuit 5, and if a new binary information is not written in the memory circuit 5, the binary information which is the same binary information as that in the just preceding reading-out period is read out by the reading-out signal S*r*, thus producing the output signal S*o*. That is, a binary information which has been lastly memorized, for instance, a binary information of the stop element S*tp* is sent out from the output terminal 9 provided that a new binary information is not sampled in the sampler 3.

In the present signal converting system, since the above-mentioned converting method is adopted, a binary signal consisting of continuous stop polarity or start polarity and binary information such as dial impulses other than start-stop telegraph signals can be sampled in the sampler 3 so as to be converted into isochronous signals and sent out from the output terminal since the binary signal includes "redundant elements which are redundant to represent binary information to be transmitted."

In the case when the telegraph modulation speed of the output signal is considerably higher than that of the input signal, it is preferable to construct the memory circuits so that these circuits can store successively more than two bits of binary information as shown in FIG. 3 by dotted line, instead of storing two bits of binary information (two signal elements) as in the case of the memory circuits 4 and 5 in FIG. 3, thereby establishing matching of the telegraph modulation speeds at the position of stop elements.

Figure 4:
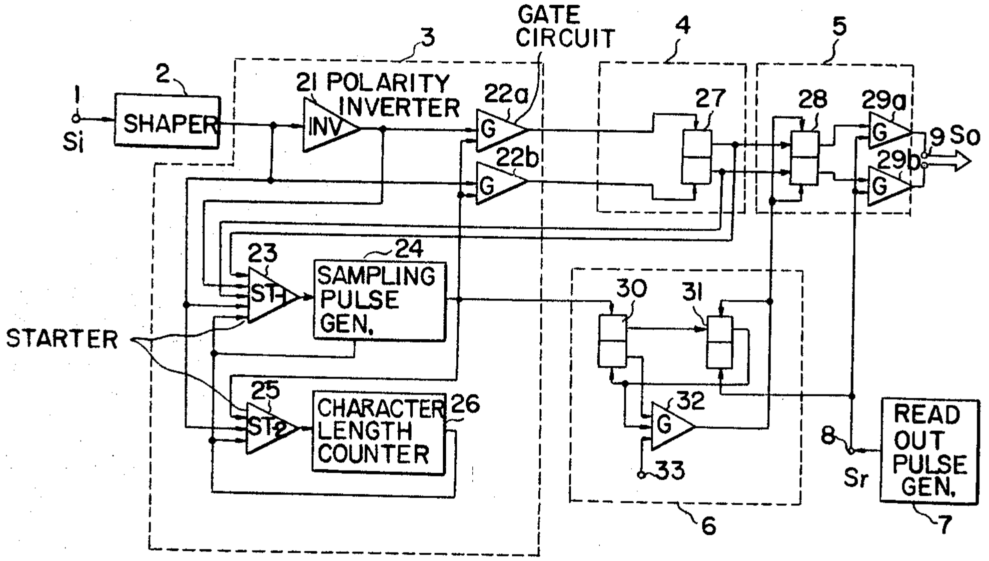

The above described fundamental operation of the present invention will be more specifically described hereinbelow. In FIG. 4 is shown a block diagram illustrating a specific example of FIG. 3. In order to avoid duplication of explanation, only the essential different points from the example shown in FIG. 3 will be described in connection with FIG. 4.

Referring to FIG. 4, an input signal S*i* supplied from the input terminal 1 is applied to the sampler 3 through the shaper 2. A polarity inverter 21 for inverting the polarity of the input signal is used to attain easy logical operation of other circuits as will be described later. The newly applied input signal and the output signal of the said inverter 21 are compared, at a starter 23 of a sampling pulse generator 24, with the polarity of binary information of the last input signal stored in a bistable circuit 27 of the memory circuit 4. On the one hand, there is provided a character length counter 26 for counting the number of code elements within one character length of the input signal S*i*. This counter 26 is a scale-of-7 counter in the case of treating a five unit code with start-stop elements.

In the case where the counter 26 is in the stop state and the comparison result obtained in the starter 23 indicates mutually opposite polarities as to two outputs of the bistable circuit 27, the starter 23 produces an output pulse. By this output pulse the sampling pulse generator 24 is started, whereby a sampling pulse the period of which is equal to the duration of the unit element of the input signal S*i* is produced. The polarity of each element of the inverted input signal is sampled by means of said sampling pulse at gate circuits **22*a* and 22*b*. The character length counter 26 stops its counting operation, upon complete measuring of the length of one character by counting the number of said sampling pulses sent from the generator 24, and resets the generator 24 to its initial state. A starter 25 is employed for starting the counter 26 and starts the counter 26 in case where the input signal takes "A" polarity (space) and at the time when the first sampling pulse arrives during the stop interval of the counter 26. Consequently, the counter 26** operates in accordance with only a signal the first code element of which is of "A" polarity as in the case of a character signal.

In contrast, since the starter 23 can produce a start pulse in both cases in which polarity conversions from "Z" polarity (mark) to "A" polarity and from "A" polarity to "Z" polarity are to be carried out, a character signal as well as binary information such as a control signal differing from the code element can be sampled in the sampler 3.

The binary information of "A" polarity or "Z" polarity which has been sampled in the gate circuits **22*a* and 22*b* is stored in a bistable circuit 27 of the memory circuit 4. The gate functions of the gate circuits 22*a* and 22*b* can be included in the bistable circuit 27 by suitable construction of said circuit 27**.

On the one hand, the output (sampling pulse) of the sampling pulse generator 24 is stored in a bistable circuit 30 of the shifter (shift control circuit) 6. A bistable circuit 31 is means for detecting whether or not the information of the bistable circuit 28 of the memory circuit 5 has been read out, the state of said circuit 31 being always reset to its empty state by the reading-out pulse S*r*. Accordingly, when the bistable circuits 30 and 31 are are respectively in stored state and the empty state, a pulse is produced from a gate circuit 32. By this pulse, the bistable circuit 31 is converted to the stored state, and the binary information which has been stored in the bistable circuit 27 is shifted into the bistable circuit 28. On the other hand, said conversion of the bistable circuit 31 causes the bistable circuit 30 to be reset to the empty state thereof. A clock pulse for producing the output pulse of the gate circuit 32 as described above is being supplied from a terminal 33, but it is necessary to select said clock pulse so that the sampling pulse produced from the generator 24 and the reading-out pulse S*r* produced from the reading-out pulse generator 7 are not coincident at their generating instants. According to the above described operation of the shifter 6, a particular relationship is not necessary between the sampling period of input binary information and the reading-out period of the stored binary information, and the matching between input side and output side telegraphic circuits having mutually different telegraph modulation speeds is made possible.

The binary information stored in the memory circuit 28 is read out, through gate circuits **29*a* and 29*b***, by means of the reading-out pulse S*r* which is supplied thereto from the terminal 8. In the case of the example illustrated in FIG. 4, the output signal S*o* produced at the terminal 9 is a pulse signal of "A" polarity or "Z" polarity. In the case in which a state signal is necessary as the output signal, it is only necessary to apply said output signal S*o* to a bistable circuit so as to convert it to a state signal.

Figure 5:
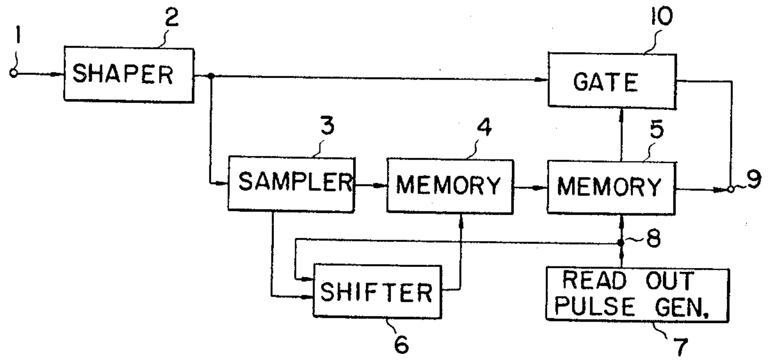

An example differing from the example of FIG. 3 will be described hereinbelow. The system of FIG. 5 relates to the case in which the memory circuit 5 is constructed so as to be a destructive reading-out system instead of a nondestructive reading-out system. In the example of FIG. 5, a gate circuit 10 is connected in parallel to the cascade circuit consisting of the sampler 3 and memory circuits 4 and 5. The gate circuit 10 is opened in the case when no binary information is stored in the memory circuit 5 at the instant of generation of the reading-out pulse S*r*, whereby the state of the input signal S*i* at said instant is read out through the shaper 2.

In FIG. 2 is shown an illustration of the converted telegraph signal obtained by converting the telegraph signal of FIG. 1 by means of the systems as illustrated in FIGS. 3 to 5. As will be clearly understood from FIG. 2, the converted binary signal is an isochronous signal and has still the characteristic of a start-stop telegraph signal, said characteristic being such that the stop element is equal to an even number multiple of the code element, so that start-stop synchronism is surely established even in said converted signal and furthermore synchronism can be rapidly restored in a receiving system of the converted signal even though the synchronism is disturbed. That is, for instance, if it is assumed that one character of the input telegraph signal consists of 7.5 units having a duration of 150 milliseconds, and one character of the converted output signal consists of 7 units having a duration of 145⅚ milliseconds, a redundant unit element corresponding to one unit element will be inserted in the output signal per about five characters. In other words, a stop element S*tp* corresponding to the duration of two unit element appears in the output signal in a proper period. This long stop element can sufficiently attain the operation of start-stop synchronization.

Of course, if necessary, it is very easy to restore the signal of FIG. 2 to the original signal of FIG. 1.

Figure 8:
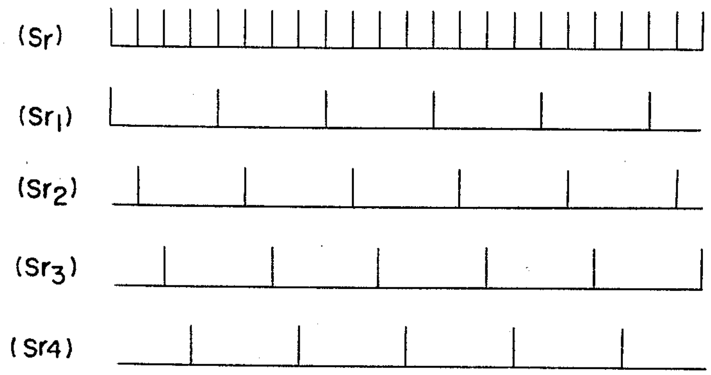
FIG. 8 shows a pulse train time chart illustrating reading out pulses to be used in the converting and aggregating system according to this invention.
Figure 9:
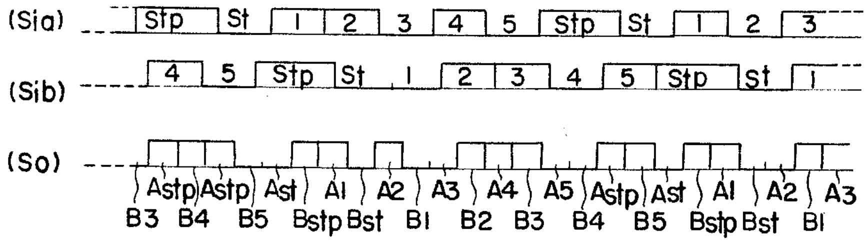
FIG. 9 shows waveform time charts of several binary signals for illustrating the conversion process according to the converting and aggregating system of this invention and an aggregated signal obtained in the process thereof.
Figure 6:
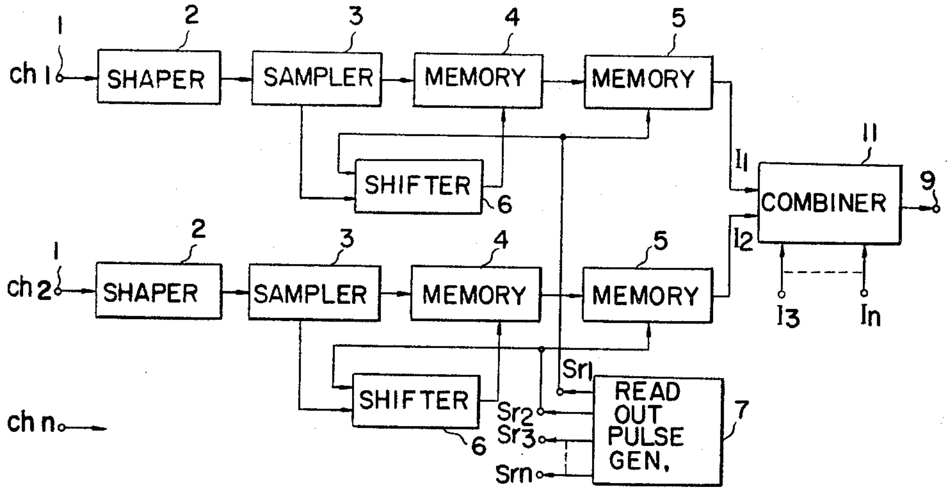
FIGS. 6 and 7 are block diagrams showing examples of the converting and aggregating system according to this invention.
Figure 7:
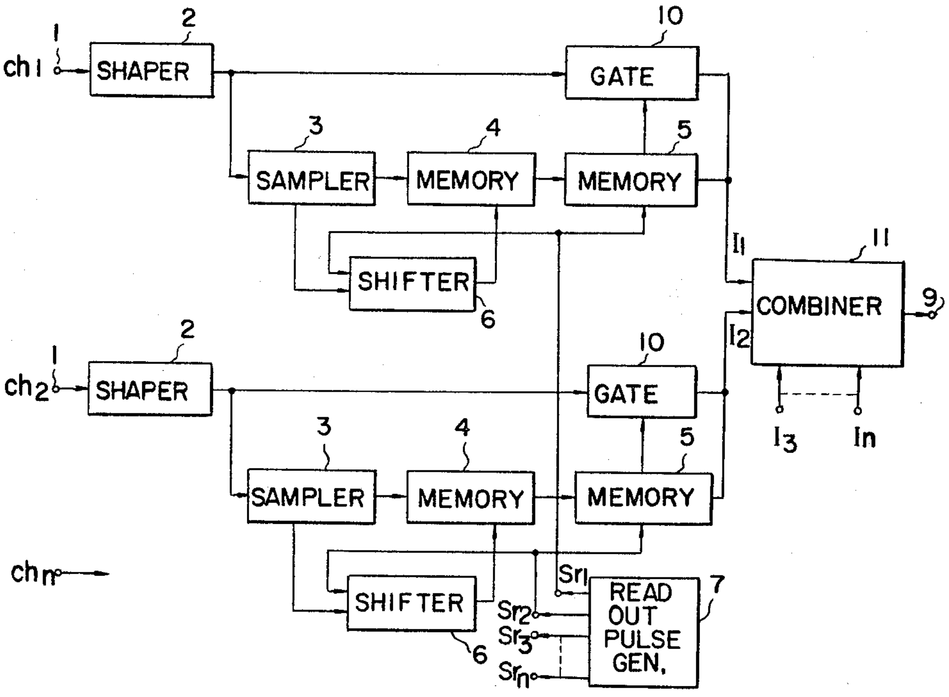

In the following, a system capable of producing a multiple signal by aggregating time-divisionally the elements of several binary signals (each including start-stop telegraph signal) will be described. The circuit of this system is constructed by aggregating several conversion circuits as illustrated in FIGS. 3 to 5 through a combiner (aggregating gate circuit) 11. The examples shown in FIGS. 6 and 7 correspond respectively to the cases of utilizing the conversion circuits as illustrated in FIGS. 3 and 5. In all examples, to the input terminal of each conversion circuit is applied a binary signal (including start-stop element) of respective, independent input communication channels ($ch_1$, $ch_2$ . . . ), and operation of each conversion circuit progresses independently up to store respective binary information into the memory circuits 4 and 5. In FIGS. 6 and 7, only $ch_1$ and $ch_2$ are shown in detail, but the converting circuit for the other communication channels are connected to the corresponding terminals (1, S*rn*, I*n* . . . ) in the same manner as described in connection with $ch_1$ and $ch_2$. In the above mentioned aggregation system, the reading-out signals (S*r*1, S*r*2 . . . S*rn*) belonging to respective input communication channels should have particular relationship to one another. That is, the reading-out pulse generator 7 generates, by the use of reading-out pulse signal (S*r* in FIG. 8) having isochronous period corresponding to a predetermined telegraph modulation speed of the output side communication circuit, reading-out pulse signals (S*r*1, S*r*2 . . . in FIG. 8) which are successively distributed to the input side communication channels. In the example of FIG. 8 there is shown an illustration of the reading-out pulse for aggregating the binary signals of four channels, but the number of inputs to be distributed can be varied depending upon the number of input communication channels. In such a manner as described above, since the reading-out pulse signals (S*r*1, S*r*2 . . . ) are successively distributed to respective input communication channels, the output signal S*o* is composed of successive binary information aggregated from different input communication channels per code element Baud-base, whereby aggregation of the elements of plural binary signals can be attained. An illustration of this aggregated output signal is shown in FIG. 9, in which for the sake of simplification of the drawing only the case of obtaining an output signal S*o* by aggregating the elements of the binary signals S*ia* and S*ib* is shown. In FIG. 9, the code elements "A" and "B" (with suffix) designate respectively code elements of converted output signals corresponding to input binary information "S*ia*" and "S*ib*." Since of two input channels to be transmitted in an output communication circuit, the reading-out pulse is alternately distributed to each of the input channels, whereby the output signal S*o* is formed so as to aggregate alternately the binary information of the two input channels.

According to the above mentioned aggregation system, even though a control signal and (or) a pulse signal other than a character signal is included in the input signal, they can be aggregated as they are. Furthermore, since there is no necessity of attaining the aggregation per particular or similar element of each input signal, aggregation of different binary informations having mutually differing numbers of unit elements (for instance, five-unit binary information and eight-unit binary information) is made possible provided that the lengths of unit elements are equal to one another.

In the conventional system for aggregating binary informations, aggregation has been attained on character base, so that there is a possibility of erroneous omission of a character or characters occurring in the transmission signal unless equality in durations of characters of respective synchronous systems is fully maintained. However, it is almost impossible to maintain equality of the duration of character in each synchronous system, and, accordingly, increase of the number of the characters to be stored in the case of aggregation is necessary in order to avoid the above-mentioned error, thus necessitating a complicated circuit.

In contrast, according to the signal converting and aggregating system of this invention, since its object is attained by achieving element aggregation and inserting redundant code elements at the positions of the start-stop codes, only the number of frequent occurrence of inserting said redundant elements varies even if there are differences between the durations of the characters of transmission systems which are connected in tandem, whereby erroneous omission of any character cannot occur, and whereby reliable signal transmission is made possible.

While particular embodiments of this invention have been described and shown, it will, of course, be understood that the invention is not to be limited thereto, since many modifications may be made in this invention, therefore, it is contemplated by the appended claims to cover all such modifications as fall within the true spirit and scope of this invention.

What I claim is:

1. A signal converting system for a telegraph signal including redundant elements comprising, memory means for storing successively in series at least two bits of input binary information including redundant elements, and control means for applying a reading-out signal to the memory means to read out in the successive order stored the stored binary information at a predetermined isochronous period, said memory means including means sending out the last stored binary information when a new bit of the binary information to be read out is not stored in the memory means, whereby an output isochronous binary signal is derived from the memory means.

2. A signal converting system for a telegraph signal including redundant elements comprising, memory means for storing successively in series at least two bits of input binary information including redundant elements, control means for applying a reading-out signal to the memory means to read out in the successive order stored the stored binary information at a predetermined isochronous period, and gate means for gating the instant state of the input binary information when a new bit of the input binary information to be read out is not stored in the memory means, whereby an output isochronous binary signal is derived from said memory means and gating means.

3. A signal converting system for a telegraph signal including redundant elements comprising, at least two memory elements connected in cascade, means for shifting binary information bits stored in a preceding one of the memory elements successively to the just succeeding one of the memory elements in accordance with the reading-out of the binary information stored in the just succeeding memory element, and control means for applying a drive signal to the memory means to read out in the successive order stored the stored binary information at a predetermined isochronous period, the last one of the memory elements comprising means sending out the last stored binary information when a new bit of the input binary information to be read out is not shifted, from the just preceding one of the memory elements, prior to the instant of reading-out period, whereby when an input binary signal including redundant elements is applied to said memory elements, an output isochronous binary signal is derived from the last one of the memory elements.

4. A signal converting system for a telegraph signal including redundant elements comprising, at least two memory elements connected in cascade, means for shifting binary information bits stored in a preceding one of the memory elements successively to the just succeeding one of the memory elements in accordance with the reading out of the binary information stored in the last succeeding memory element, control means for applying a drive signal to the memory means to read out in the successive order stored the s.ored binary information at a predetermined isochronous period, and gate means for gating the instant state of the input binary information when a new bit of the binary information to be read out is not being stored in the last one of the memory elements, whereby when an input binary signal including redundant elements is applied to said memory elements an output isochronous binary signal is derived from the last succeeding memory element.

5. A multiplex system for a plurality of telegraph signals including redundant elements comprising a plurality of memory means each storing successively in series at least two bits of input telegraph signals including redundant elements, and control means for generating pulse trains each having a period equal to the number of the applied input telegraph signals, and the period of an output isochronous aggregate signal and delayed successively by an interval equal to the period of the output isochronous signal, means for applying said pulse trains respectively, to the plurality of memory means to read out the stored binary information and to cause said memory means to send out the last stored binary information when a new bit of the binary information to be read out is not shifted to the last one of the memory means, whereby when a plurality of input telegraph signals are respectively applied to the corresponding one of said plurality of memory means, the output isochronous binary signal aggregated is derived from said memory means.

6. A multiplex system for a plurality of telegraph signals including redundant elements comprising a plurality of memory means each storing successively at least two bits of an input telegraph signal including redundant elements, control means for generating pulse trains each having a period equal to the number of the applied input telegraph signals and the period of an output isochronous aggregate signal and delayed successively by an interval equal to the period of the output isochronous signal, means for applying said pulse trains respectively to said plurality of memory means to read out the stored binary information, and a plurality of gate means each for gating the respective instant states of said plurality of input binary information when a new bit of the input binary information to be read out is not stored in the memory means, whereby when a plurality of input telegraph signals are respectively applied to said plurality of memory means, the output isochronous binary signal aggregated is derived from said memory means.

References Cited

UNITED STATES PATENTS

| | | | |
|---|---|---|---|
| 2,833,858 | 5/1958 | Grondin | 178—70 |
| 2,879,332 | 3/1959 | Reek et al. | 178—26.5 |
| 2,903,513 | 9/1959 | Phelps et al. | 178—17.5 |

THOMAS A. ROBINSON, *Primary Examiner.*